US005629687A

United States Patent [19]
Sutton et al.

[11] Patent Number: 5,629,687
[45] Date of Patent: May 13, 1997

[54] UNIVERSAL INTERFACE FOR REMOTELY-MONITORED SECURITY SYSTEMS

[75] Inventors: Gary E. Sutton, La Jolla; Roger A. Moore, Running Springs; Milt E. Hamilton, Glendora; Manuel Castillo, North Hollywood, all of Calif.

[73] Assignee: Emergency Technologies, Inc., Redmond, Wash.

[21] Appl. No.: 297,027

[22] Filed: Aug. 29, 1994

[51] Int. Cl.[6] .................................................. G08B 13/00
[52] U.S. Cl. ...................... 340/825.37; 379/106; 379/37; 340/541; 340/825.36
[58] Field of Search ..................................... 379/102, 106, 379/37–51; 340/500, 505, 541, 533, 566, 691, 825.37, 825.36, 644, 521, 503

[56] References Cited

U.S. PATENT DOCUMENTS

| | | | |
|---|---|---|---|
| 4,023,139 | 5/1977 | Samburg | 340/541 |
| 4,141,006 | 2/1979 | Braxton | 340/541 |
| 4,365,120 | 12/1982 | Pounds | 200/5 |
| 4,493,947 | 1/1985 | Loveless | 379/106 |
| 4,538,138 | 8/1985 | Harvey et al. | 379/49 X |
| 4,763,349 | 8/1988 | Siegel et al. | 379/106 |
| 4,951,029 | 8/1990 | Severson | 340/506 |
| 5,164,979 | 11/1992 | Choi | 340/533 |
| 5,398,277 | 3/1995 | Martin, Jr. et al. | 379/39 |
| 5,400,011 | 3/1995 | Sutton | 340/825.49 |

FOREIGN PATENT DOCUMENTS

| | | | |
|---|---|---|---|
| 2367325 | 6/1978 | France | 340/541 |
| 404180198 | 6/1992 | Japan | 340/541 |
| 2258073 | 1/1993 | United Kingdom | 340/541 |

*Primary Examiner*—Michael Horabik
*Assistant Examiner*—William H. Wilson, Jr.
*Attorney, Agent, or Firm*—Brown, Martin, Haller & McClain

[57] ABSTRACT

An operator interface device is connected to the central control unit of a remotely-monitored security system, which also includes one or more local control units located at monitored sites. A local control unit may initiate a telephone call to the central control unit to alert the operator of an event such as an intrusion at the site. The interface device has a keypad on which the operator can enter commands that are transmitted to the local control unit. A processor in the interface device uses a look-up table, state machine or other predetermined relationship to translate the command entered by the operator into the native or local command recognized by the local control unit.

15 Claims, 4 Drawing Sheets

UNIVERSAL INTERFACE FOR REMOTELY-MONITORED SECURITY SYSTEMS

BACKGROUND OF THE INVENTION

The present invention relates generally to remotely monitored security systems that have audio monitoring capability and, more particularly, to a device and method for providing a control system for a monitoring station that provides a common or universal operator interface.

A remotely monitored security system comprises a central monitoring station and, at each monitored premises, a local control unit connected to one or more detectors. The detectors are placed at strategic points in the monitored area, such as doors and windows. Upon the occurrence of an event, such as the opening of a door or window, the local control unit alerts personnel at the monitoring center and transmits an identifying serial number. The telephone network is typically the medium over which the alert is transmitted. The personnel at the monitoring center can then respond to the situation by taking appropriate action. Such action typically includes dispatching security personnel or police to the premises.

False alarms are a serious problem in security systems. Not only does dispatching security personnel or police in response to a false alarm waste resources, but in many communities it subjects property owners to fines if police are repeatedly summoned. To avoid such problems, security systems may provide additional information following the initial alert to aid monitoring personnel in distinguishing false alarms from alarms occurring in response to actual events that the security system is intended to detect. For example, a security system may provide information identifying the premises and the type and location of the particular detector that triggered the alarm. The central monitoring station computer uses the serial number received from the local control unit to retrieve such information, which is stored in a database. The computer typically displays the information on a video screen.

The additional information may also include sounds occurring at the premises immediately following the initial alert. A security system may have one or more microphones placed at strategic locations in the premises. Via the telephone connection established by the activation of the alarm, monitoring personnel can transmit commands that enable them to listen to sounds on the premises. In so-called "two-way voice" security systems that have one or more speakers placed at strategic locations in the structure, monitoring personnel can transmit commands that enable them to speak to those on the premises. This allows monitoring personnel to verify the alarm situation by issuing a verbal challenge to those on the premises. If the security system includes multiple microphones or speakers, monitoring personnel may also transmit commands to select the microphone or speaker with which they desire to establish audio communication. Still other commands allow monitoring personnel to switch the gain of a microphone at the monitored premises between a high and a low level.

Security systems that allow monitoring personnel to hear sounds occurring at the premises may also include audio recording or storage devices at the monitored premises for storing any sounds that may have occurred immediately preceding the activation of the alarm. Such "stored-audio" systems commonly have a continuous-loop digital storage medium located on the monitored premises. The security system continuously records ambient sound until the alarm is activated. Monitoring personnel can transmit commands to play back the recorded sounds. Stored-audio systems may allow monitoring personnel to remotely select either the stored audio or the "live" audio captured in real-time by the microphones.

Security systems with which monitoring personnel can interact by transmitting commands thus allow monitoring personnel to deduce the nature of an alarm and tailor their actions accordingly. Should the alarm activation be confirmed as harmless, the response protocol can be terminated at a relatively early stage without unnecessary expenditure of scarce resources.

The central control unit at the remote monitoring center typically includes a conventional multi-line telephone instrument that has a 12-key telephone keypad on which monitoring personnel may enter commands to perform the desired functions at the monitored premises. Each command is initiated by one or more keystrokes that the telephone instrument transmits in dual-tone multi-frequency (DTMF) format to the local control unit at the monitored premises. The local control unit at the monitored premises includes a DTMF decoder for translating the DTMF signals into signals that activate the desired functions.

A security system having a local control unit that receives and performs functions in response to DTMF signals may have one or more of the above-described functions, i.e., one-way voice, two-way voice, stored audio, individually selectable microphones, microphone gain control, and individually selectable speakers. One or more commands may be associated with each of these functions. For example, a system having a two-way voice function may have a "TALK" command and a "LISTEN" command. The security systems produced by different manufacturers, however, do not necessarily assign the same commands to the same keys on the telephone keypad: A system having a two-way voice feature may, for example, assign the "TALK" command to the "1" key; another system having the same feature may assign the "TALK" command to the "5" key; and still another system may assign the "TALK" command to the keystroke sequence "23". One system may require personnel to enter a keystroke once to initiate a command and enter it again to cancel the command, while another system may continue to perform the command initiated by the keystroke until a different keystroke is entered.

A monitoring center may monitor security systems having various functions and/or key assignments for the commands associated with those functions. The absence of any standardization among remote monitoring security systems is frustrating to monitoring personnel who must simultaneously monitor and, using the telephone keypad at their console, operate many local control units, each possibly having its own unique set of functions, commands, and keystrokes. Critical time may be lost in responding to an alarm if monitoring personnel are not thoroughly familiar with the operation of each of the security systems they monitor.

To mitigate the problem of absence of standardization, security systems have been developed that, in response to an alarm, display instructions on the video console at the monitoring center that are specific to the system transmitting the alarm. The instructions provide monitoring personnel with information regarding the features present in the system transmitting the alarm, the functions that the system can perform, and the correspondence between the keys on the keypad and the commands that execute those functions. Nevertheless, this method requires time for monitoring personnel to read the instructions and understand them.

It would be desirable to provide monitoring personnel with a common or universal interface between their control panels and monitored security systems having various combinations of functions, commands and key assignments. These problems and deficiencies are clearly felt in the art and are solved by the present invention in the manner described below.

SUMMARY OF THE INVENTION

The present invention comprises an interface between personnel at the monitoring center of a remotely monitored security system and the telephone system over which commands are transmitted to the local control unit at a monitored site. The security system has a central control unit at the monitoring center and a local control unit at each monitored site. The central control unit and the local control units may be of any suitable type known in the art that communicate using DTMF bursts transmitted over a telephone connection. Although the general construction and operation of the central control unit and local control units are well-known, several key aspects should be noted to facilitate complete understanding of the present invention. The local control units can initiate a telephone call to the monitoring center in response to the detection of an event, such as an intrusion, fire or other emergency at the monitored premises. The central control unit can answer the incoming call and establish a telephone connection. The central control unit also includes a computer or other suitable control system that can receive any data transmitted by a local control unit via the telephone connection. The central control unit may also include a telephone instrument.

The central control unit may simultaneously monitor different types of local control units having different functions, such as one-way or two-way voice communication, selectable microphones, selectable speakers, microphone gain control, and stored-audio. Different types of local control units respond to different commands for operating their respective functions. Each command to which a local control unit can respond consists of a sequence of one or more DTMF bursts.

After it establishes a telephone connection, a local control unit may transmit information of any type typically transmitted by remotely monitored security systems. The information includes a serial number that uniquely identifies the monitored site. The monitoring center computer uses the serial number as an index to retrieve information about the site. The computer displays this site information on a CRT terminal for viewing by the operator or uses it in any other manner known in remotely monitored security systems. The site information includes a code that identifies its type. This "type identifier" is provided to the novel operator interface device of the present invention.

The operator interface device includes an input device, such as a keypad, with which the operator can enter any command in a predetermined set of "central commands." The interface includes a memory in which is stored the correspondence or predetermined relationship between each command to which a local control unit can respond, i.e., a "local command," and a sequence of one or more central commands. Each local command is defined by a sequence of one or more DTMF bursts.

The operator interface also includes an interface controller that translates a sequence of one or more central commands into a sequence of one or more local commands. Using the type identifier as an index, the interface controller selects a predetermined relationship in the memory. A predetermined relationship may be a simple one-to-one relation that provides a predetermined sequence of one or more local commands in response to a central command, or it may be a state machine that provides a predetermined sequence of local commands in response to a predetermined sequence consisting of the central command and one or more previously-entered central commands. The predetermined relationship thus may respond to an operator input, such as a keystroke, by providing a DTMF burst or sequence of bursts, by entering another state, or both. Nevertheless, a predetermined relationship may not respond at all to a central command if the local control unit is of a type that responds to fewer than all of the central commands, i.e., a subset, and the central command entered by the operator is not in the subset. To identify for the operator only those central commands that are in the subset available for operator entry, the interface controller may provide a visual indication. For example, if the input device is a keypad with selectably illuminated keys, the central control unit may illuminate only those keys that correspond to available commands.

The foregoing, together with other features and advantages of the present invention, will become more apparent when referring to the following specification, claims, and accompanying drawings.

BRIEF DESCRIPTION OF THE DRAWINGS

For a more complete understanding of the present invention, reference is now made to the following detailed description of the embodiments illustrated in the accompanying drawings, wherein.

DESCRIPTION OF THE PREFERRED EMBODIMENT

Figure 1:
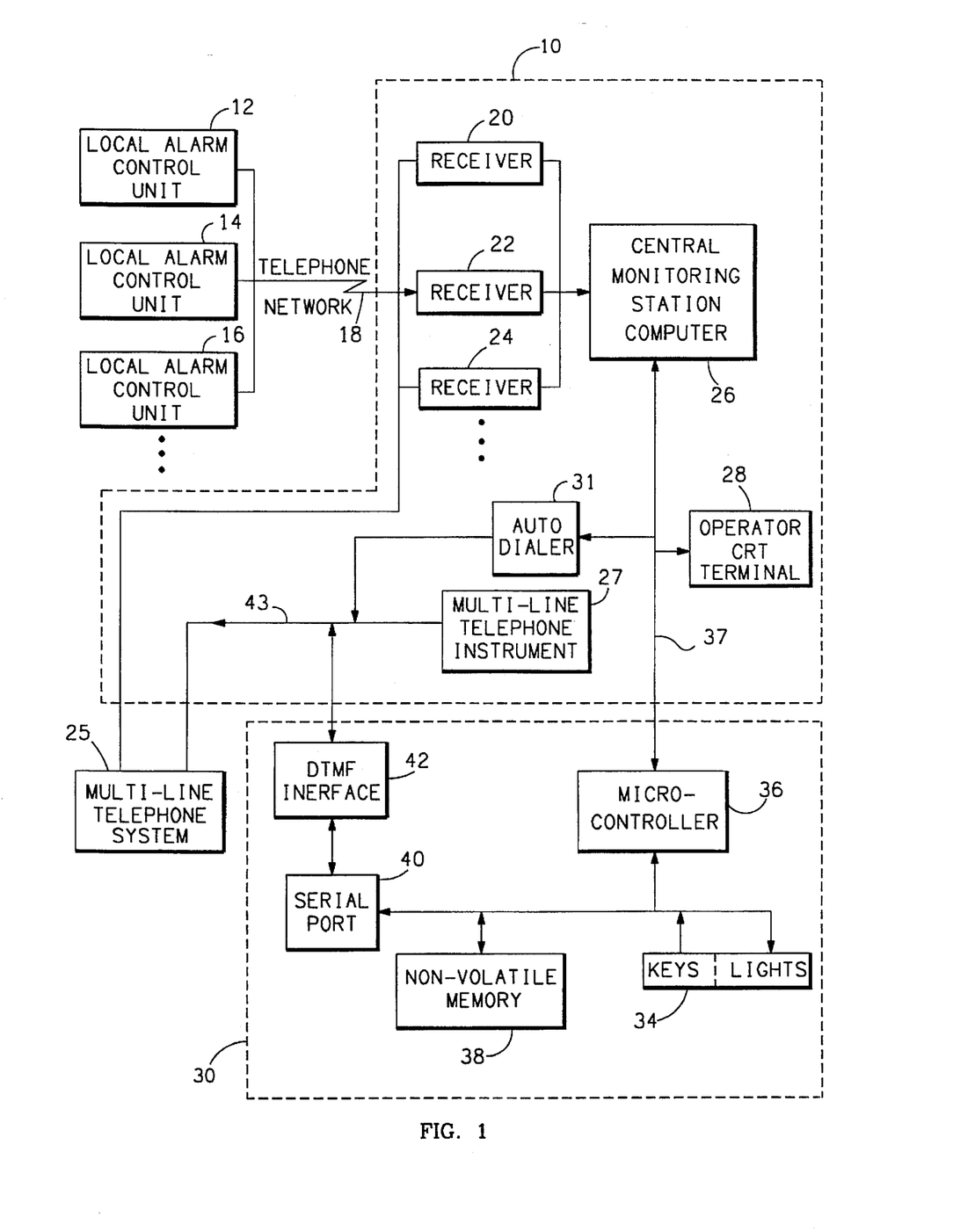
FIG. 1 is a block diagram of a security system including the operator interface device.

As illustrated schematically in FIG. 1, a security system includes a central control unit 10 at a monitoring station and multiple local control units, such as local control units 12, 14 and 16, at remote sites. Any of local control units 12, 14 or 16 may detect an event, such as an intrusion, and, in response, initiate a telephone call over the telephone network 18 to central control unit 10. Central control unit 10 has one or more receivers 20, 22 and 24 that monitor one or more lines of a multi-line telephone system 25 and can answer an incoming call. Receivers 20, 22 and 24 operate in a well-known manner, similar to that of a standard computer modem, to demodulate signals received via the telephone connection. As is common in central control units of remotely monitored security systems, central control unit 10 includes multiple receivers to communicate with the different types of local control units having different communication protocols. The receiver that recognizes the protocol of an incoming call answers that call.

After a receiver 20, 22, or 24 answers a call, the local control unit 12, 14 or 16 that initiated the call, using a suitable modulation method, transmits ASCII-encoded digital data. The data includes a serial number that uniquely identifies the monitored site. The receiver demodulates the data and provides it to the central computer 26.

Central computer 26 has an internal database, stored on a suitable medium such as a disk drive, that includes information about each monitored site, such as the street address of the site, and the number, type and location of detectors. Central computer 26 uses the serial number as an index to retrieve site information from its database. Central computer 26 then outputs the site information to a CRT terminal 28 for an operator to view.

The site information also includes a type identifier. The type identifier consists of a flag followed by a type number. The flag is preferably an ASCII-encoded character or character string that is not normally used in site information. For example, a tilde ("~") character may be used. The type number is preferably a two-digit ASCII-encoded number that is uniquely associated with the type of local control unit that initiated the call. As described in further detail below, an interface 30 monitors the site information as it is output by central computer 26. When interface 30 detects the flag, it extracts the type number that follows.

Central control unit 10 preferably also includes a multi-line telephone instrument 27. Although an operator may use telephone instrument 27 to communicate with a local control unit in the manner known in the art, it is the novel interface 30 that allows the operator to communicate with local control units of any type in a consistent, uniform manner.

Figure 2:
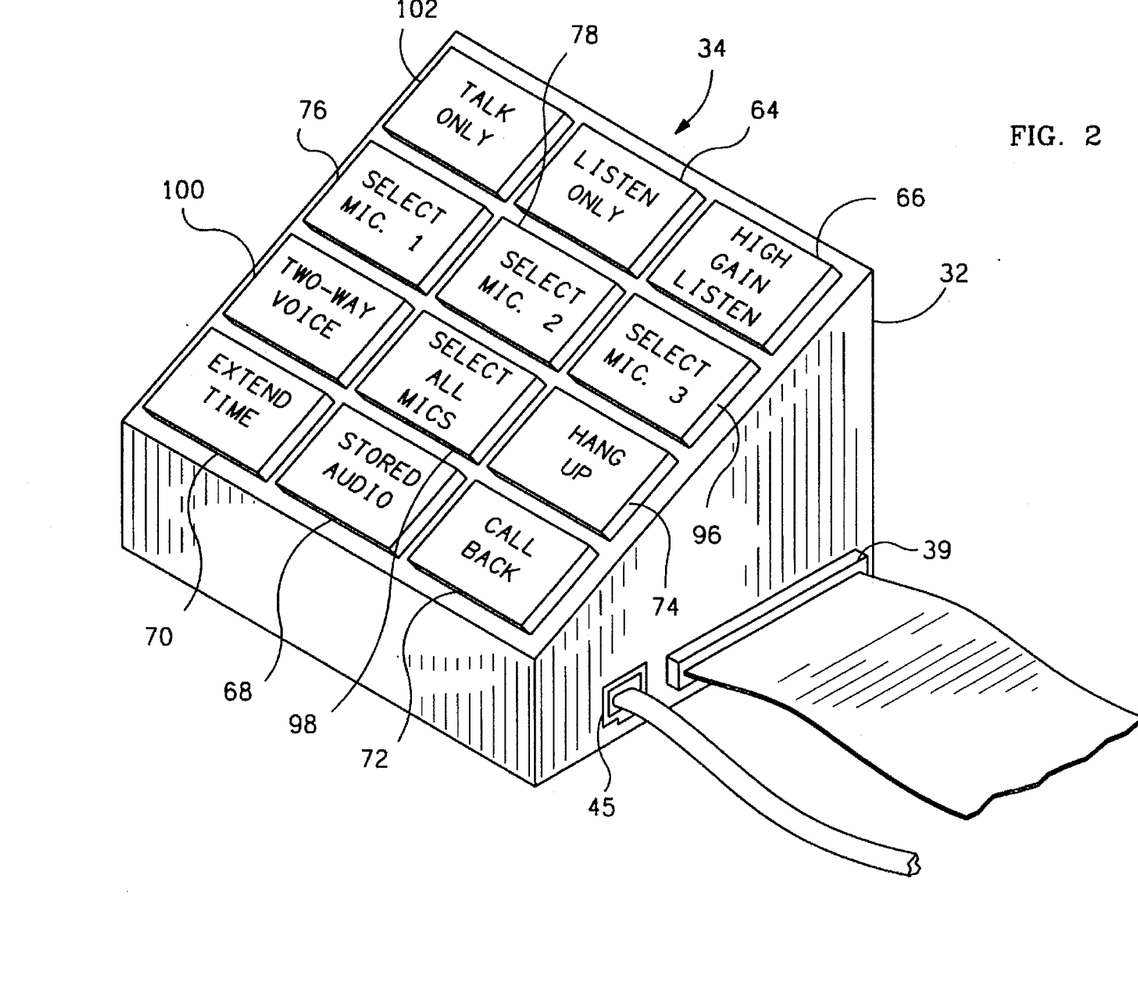
FIG. 2 is a perspective view of the operator interface device.

Referring briefly to FIG. 2, interface 30 preferably includes a housing 32 on which is mounted a keypad 34. Keypad 34 preferably comprises at least twelve illuminated, momentary-contact, pushbutton switches. Each key is labeled with one of the following twelve central commands:

"TALK-ONLY"

"LISTEN-ONLY"

"HIGH-GAIN LISTEN"

"SELECT MICROPHONE 1"

"SELECT MICROPHONE 2"

"SELECT MICROPHONE 3"

"TWO-WAY VOICE"

"SELECT ALL MICROPHONES"

"HANG UP"

"EXTEND TIME"

"STORED AUDIO"

"RESET"

Returning to FIG. 1, local control units 12, 14 and 16 respond to local commands, each of which is defined by a sequence of one or more DTMF bursts. Each DTMF burst is of the type that would be generated by one keystroke on a standard 12-key telephone instrument, such as telephone instrument 27. The DTMF bursts are designated herein by the notation DTMF "1", DTMF "2", DTMF "3", ... DTMF "9", DTMF "*", DTMF "0", and DTMF "#". The set of local commands to which control units 12, 14 and 16 respond may not be equal to the above-listed set of central commands. For example, local control unit 12 may respond to the following local commands, which form a subset of the set of central commands:

"LISTEN: LOW GAIN" (DTMF "1")

"LISTEN: HIGH GAIN" (DTMF "2")

"STORED AUDIO" (DTMF "3")

"EXTEND TIME" (DTMF "4")

"TWO-WAY VOICE" (DTMF "5")

"HANG UP" (DTMF "6")

Because the use of these commands and their effect on a local control unit are well-known or readily apparent to persons of skill in the art, they are described only briefly herein. In response to a DTMF "1", local control unit 12 routes the output of a microphone (not shown) located at the monitored site to the telephone connection to enable an operator to listen to sounds occurring at the site. In response to a DTMF "2", local control unit 12 routes the output of the microphone to the telephone connection, but sets the gain of the microphone to a predetermined higher level. In response to a DTMF "3", local control unit 12 routes the output of a stored audio recorder (not shown) to the telephone connection to enable an operator to listen to sounds that occurred just prior to the activation of the alarm. In response to a DTMF "4", local control unit 12 does not hang up, as it otherwise would after a predetermined timeout period, but rather resets the timeout period. In response to a DTMF "5", local control unit 12 enters a two-way voice mode in which the operator may both listen to sounds at the site and broadcast his voice to the site. In two-way voice mode, local control unit 12 sets the gain of the microphone to the lower level in order to avoid feedback. In response to a DTMF "6", local control unit 12 hangs up the telephone call.

Other local control units may respond to a set of local commands that is not a subset of the set of central commands, but rather includes local commands that are combinations of multiple central commands. For example, local control unit 14 may respond to a set of local commands that includes the following:

"LISTEN-ONLY MIC. 1: GAIN TOGGLE" (DTMF "1")

"LISTEN-ONLY MIC. 2: GAIN TOGGLE" (DTMF "2")

As noted above with respect to local control unit 12, because the use of these commands and their effect on local control unit are well-known in the art, they are described only briefly herein. In response to a DTMF "1" or DTMF "2", local control unit 14 selects a first or second microphone (not shown), respectively, and connects the output of the selected microphone to the telephone connection to enable an operator to listen to sounds occurring at the monitored site. Local control unit 14 sets the gain to a first, predetermined value. If local control unit 14 receives an initial DTMF "1", it toggles the gain between that first value and a second, higher value in response to each subsequent DTMF "1" it receives. Similarly, if local control unit 14 receives an initial DTMF "2", it toggles the gain between the first value and a second, higher value in response to each subsequent DTMF "2" it receives. Local control unit 14 sets the gain to the first value each time it receives either a DTMF "1" followed by a DTMF "2" or a DTMF "2" followed by a DTMF "1".

Interface 30 includes a microcontroller 36 operating under the control of suitable software and a serial port 40 that communicates with central computer 26 via a RS-232 line 37. RS-232 line 37 is connected to interface 30 at a RS-232 connector 39, shown in FIG. 2. Interface 30 also includes a memory 38, which is preferably a non-volatile type, such as EEPROM. The software that microcontroller 36 executes is preferably stored in memory integral to microcontroller 36, but it may alternatively be stored in memory 38. Interface 30 further includes a suitable DTMF interface 42. DTMF interface 42 is connected to a telephone line 43 of multi-line telephone system 25 using a telephone connector 45, shown in FIG. 2. Although DTMF interface 42 must at least generate DTMF bursts in response to digital data, it is preferably bidirectional.

Figures 3, 4:
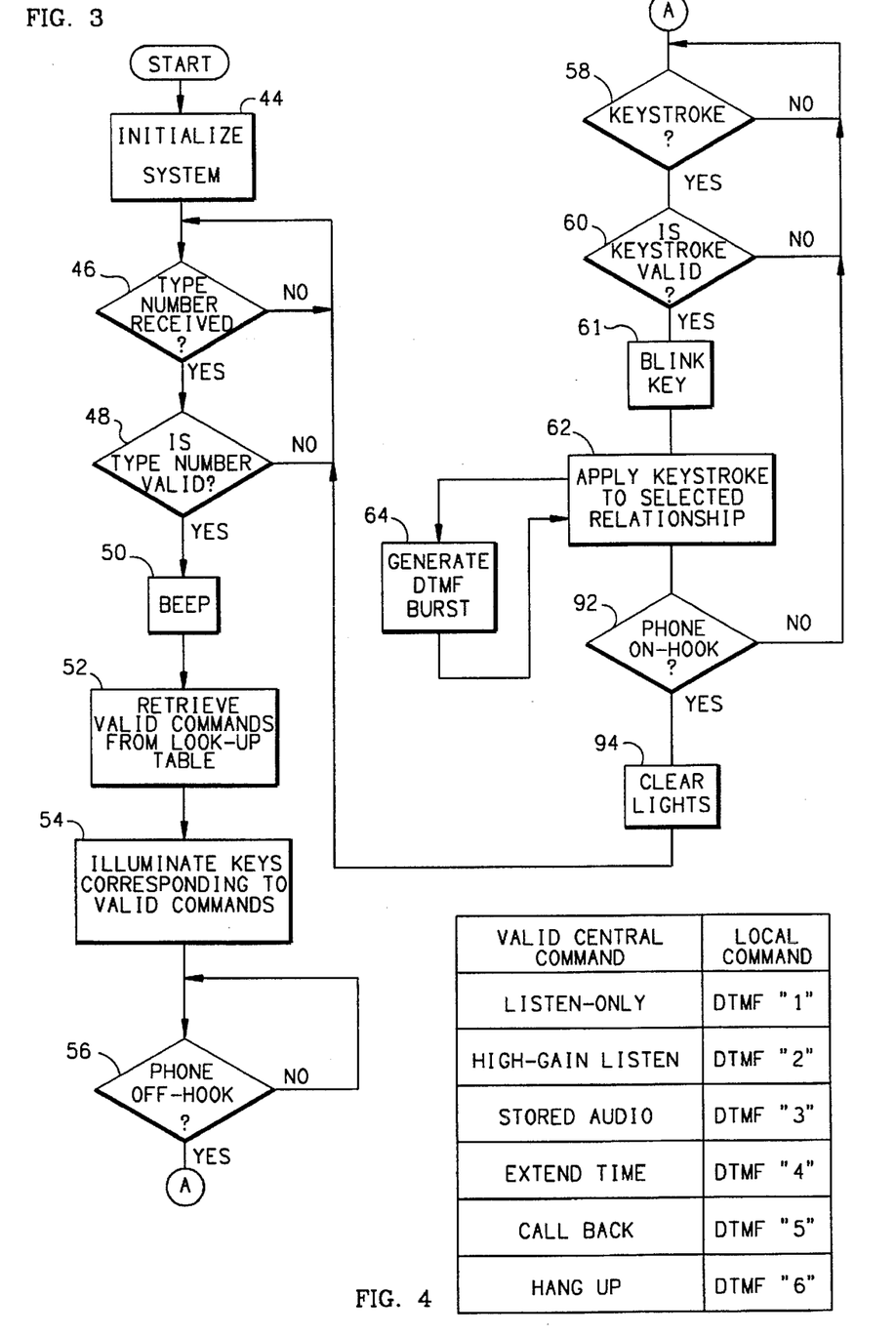
FIG. 3 is a flow diagram showing the operation of the operator interface device.
FIG. 4 is a state diagram showing the correspondence between local commands and central commands for one type of local control unit.

Microcontroller 36 operates in accordance with the method illustrated in FIG. 3. At step 44, microcontroller 36 performs any initialization required as a result of the software implementation. Microcontroller 36 continuously loops at step 46 and monitors RS-232 line 37 until it detects the flag of a type identifier. It then extracts the type number that follows. At step 48, microcontroller 36 uses the type number to select one of a plurality of predetermined relationships that are stored in memory 38. Although the predetermined relationships are described in further detail below, it should be noted that each predetermined relationship uniquely corresponds to a different type of local control unit. If microcontroller 36 cannot find a stored predetermined relationship that corresponds to the type number, it returns to step 46 and awaits another type number. At step 50, microcontroller 36 indicates to the operator that it has received a valid type number by causing a speaker (not shown) to emit a tone or "beep."

Each predetermined relationship includes a set of valid or selectable commands. The set of valid commands consists of all central commands to which a local control unit of the type corresponding to the received type number is capable of responding. At step 52, microcontroller 36 retrieves the set of valid commands from the selected predetermined relationship and illuminates the keys of keypad 34 that correspond to valid commands. The illuminated keys indicate to the operator that the operator can press them to select the central commands with which the keys are labeled.

At step 58, microcontroller 36 monitors keypad 34 and loops continuously until the operator enters a keystroke. At step 60, microcontroller 36 compares the keystroke to the set of valid commands. If the key that was depressed does not correspond to one of the valid commands, microcontroller 36 returns to step 58 to await another keystroke. Therefore, depressing a key other than one that is illuminated has essentially no effect. In response to actuation of a key corresponding to a valid command, microcontroller 36 preferably changes the illumination of the key from steady to blinking at step 61.

At step 62, microcontroller 36 uses the keystroke and the selected predetermined relationship to generate one or more DTMF bursts. If a predetermined relationship is such that the DTMF burst output is dependent upon only a single keystroke, the predetermined relationship may be described as a look-up table. For example, as described above, the local commands to which local control unit 12 responds are a subset of the set of central commands. Because they correspond to the set of valid commands, the "LISTEN-ONLY" key 64, the "HIGH-GAIN LISTEN" key 66, the "STORED AUDIO" key 68, the "EXTEND TIME" key 70, the "TWO-WAY VOICE" key 100, and the "HANG UP" key 74 would be illuminated at step 54, as described above. Depressing one of these keys should result in the generation of a single local command, i.e., a single DTMF burst. As illustrated in FIG. 4, the predetermined relationship thus comprises a look-up table relating each valid command to the DTMF burst corresponding to a local command. Microcontroller 36 uses the keystroke as an index to retrieve the local command from the look-up table and, as shown in FIG. 3, generates the corresponding DTMF burst via DTMF interface 42 at a sub-step 64 of step 62.

Other predetermined relationships may be such that the DTMF burst output is dependent upon a sequence of two or more keystrokes. The predetermined relationship can thus be described as a state machine rather than a look-up table. For example, as described above, the local commands to which local control unit 14 responds are not a subset of the set of central commands, but rather are dependent upon a sequence of central commands. The predetermined relationship is thus defined, at least in part, by the state machine illustrated in FIG. 5. The keys corresponding to the valid commands are the "SELECT MIC. 1" key 76, the "SELECT MIC. 2" key 78, and the "HIGH GAIN LISTEN" key 66. These keys are illuminated at step 54, as described above.

Figure 5:
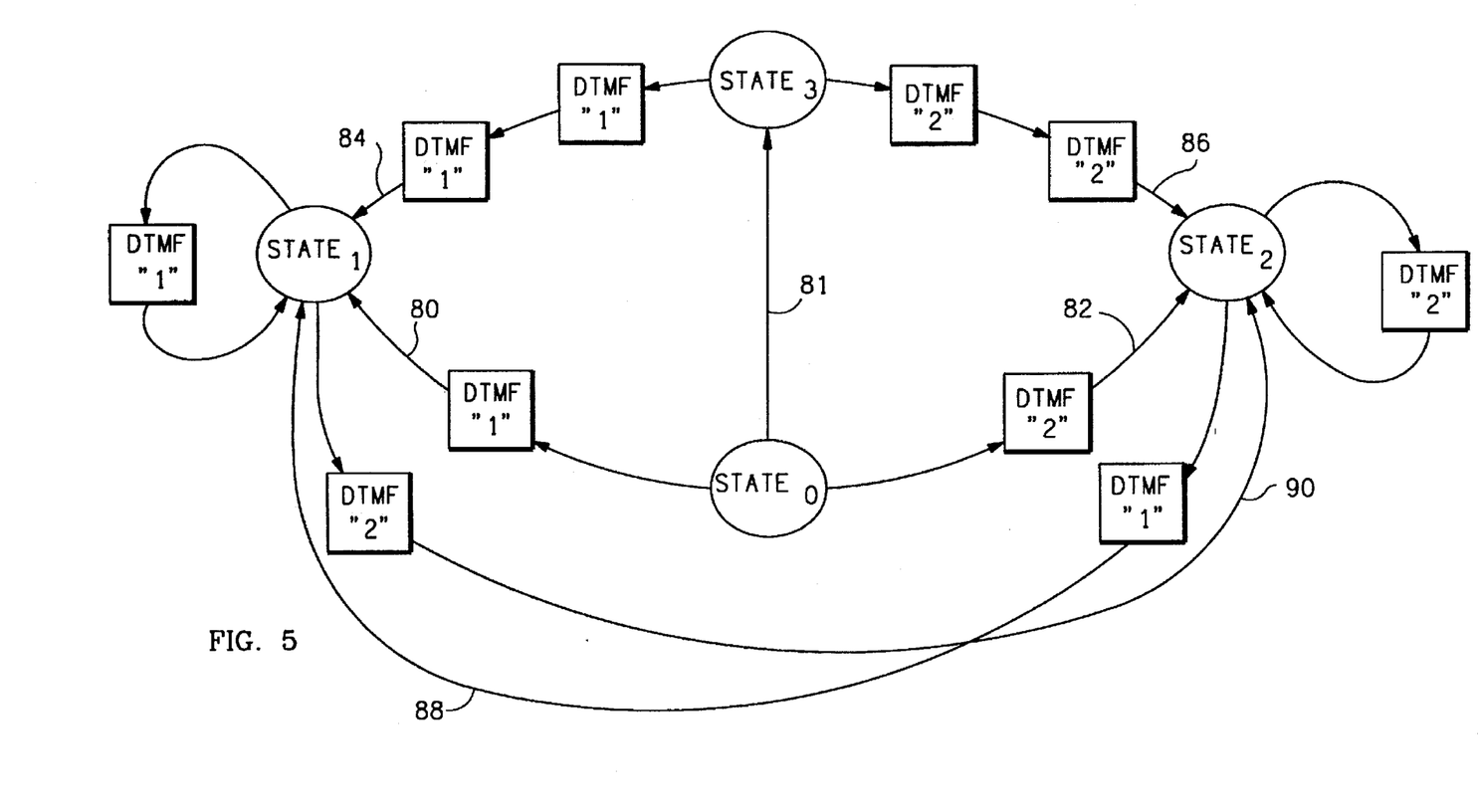
FIG. 5 is a state diagram showing the correspondence between local commands and central commands for another type of local control unit.

Initially in state$_0$, microcontroller 36 may change to state$_1$ via path 80 in response to actuation of "SELECT MIC. 1" key 76. As described above, microcontroller 36 causes key 76 to blink at step 61. In changing from state$_0$ to state$_1$, microcontroller 36 generates a DTMF "1" via DTMF interface 42. As described above, this DTMF burst is generated at sub-step 64 of step 62. Microcontroller 36 remains in state$_1$ until a further keystroke. As described above, in response to an initial DTMF "1", local control unit 14 activates a first microphone and sets the microphone gain to a predetermined (lower) level. Similarly, microcontroller 36 may change to state$_2$ via path 82 in response to actuation of "SELECT MIC. 2" key 78. Microcontroller 36 causes key 78 to blink at step 61. In changing from state$_0$ to state$_2$, microcontroller 36 generates a DTMF "2" at sub-step 64 via DTMF interface 42. In response to an initial DTMF "2", local control unit 14 activates a second microphone and sets the microphone gain to a predetermined (lower) level. Also from state$_0$, microcontroller 36 may change to state$_3$ via path 81 in response to actuation of "HIGH GAIN LISTEN" key 66. As described above, microcontroller 36 causes key 66 to blink at step 61. Microcontroller 36 does not perform sub-step 64 (and thus no DTMF burst is generated) because no microphone is yet selected. From state$_3$, however, microcontroller 36 may change to state$_1$ via path 84 in response to actuation of "SELECT MIC. 1" key 76. In changing from state$_3$ to state$_1$, microcontroller 36 generates a DTMF "1" twice. As described above, the second of these DTMF "1" bursts toggles the microphone gain to the second, higher value. Similarly, from state$_3$, microcontroller may 36 change to state$_2$ via path 86 in response to actuation of "SELECT MIC. 2" key 78. In changing from state$_3$ to state$_2$, microcontroller 36 generates a DTMF "2" twice. As described above, the second of these DTMF "2" bursts toggles the microphone gain to the second, higher value. While remaining in state$_1$ or state$_3$, microcontroller 36 may generate a DTMF "1" or a DTMF "2", respectively, in response to actuation of "HIGH GAIN LISTEN" key 66. The DTMF burst thus toggles the gain of the respective microphone. Also, from state$_1$, microcontroller 36 may change to state$_2$ via path 90 in response to actuation of "SELECT MIC. 2" key 78. In changing from state$_1$ to state$_2$, microcontroller 36 generates a DTMF "2" and causes key 76 to cease blinking and "SELECT MIC. 2" key 78 to begin blinking. Similarly, from state$_2$, microcontroller 36 may change to state$_1$ via path 88 in response to "SELECT MIC. 1" key 76. In changing from state$_2$ to state$_1$, microcontroller 36 generates a DTMF "1" and causes "SELECT MIC. 2" key 78 to cease blinking and "SELECT MIC. 1" key 76 to begin blinking.

After microcontroller 36 has computed the response of the selected predetermined relationship to the keystroke at step 62, microcontroller 36 determines at step 92 whether the keystroke was, in fact, "HANG UP" key 74. In addition to causing the local control unit to hang up, this keystroke also resets interface 30. If the keystroke was "HANG UP" key 74, microcontroller 36 ends the illumination of the keys at step 94 and returns to step 46. If the keystroke was not "HANG UP" key 74, microcontroller 36 returns to step 58 to await another keystroke.

A "RESET" key 72 can be used to effect functions internal to interface 30 or to communicate with computer 26. For example, in response to actuation of "RESET" key 72, microcontroller 36 can send a message to computer 26 that causes computer 26 to transfer the call to a different operator console. In further response to actuation of this key, microcontroller 36 ends illumination of all keys and returns to step 44.

Local control units 12 and 14 and their associated set of local commands are intended only as illustrative of predetermined relationships between local commands and central commands. Local control units 12 and 14 may respond to other local commands in addition to those described above. For example, local control unit 14 also preferably responds to at least "HANG UP." Nevertheless, for purposes of clarity, only a minimum number of commands needed to adequately illustrate the use of a state machine predetermined relationship are shown in FIG. 5; a state diagram including six or more different local commands, which is a number typical of local control units known in the art, would be so complex as to be unclear. In view of the above teachings, however, persons of skill in the art will readily be capable of designing suitable look-up tables or state machines to implement additional local commands. Furthermore, such persons will readily be capable designing suitable software for implementing such look-up tables or state machines.

Interface 30 has keys labeled with central commands in addition to those described above. For example, a local control unit may have three microphones; interface 30 thus has a "SELECT MIC. 3" key 96 that can be used in a state machine in the same manner as described above with respect to "SELECT MIC. 1" key 76 and "SELECT MIC. 2" key 78. Interface 30 also has a "SELECT ALL MICS." key 98. Key 98 can be used in a manner similar to that described above to select both microphones in local control unit 14 or all three microphones in a local control unit having three microphones.

As described above, only the keys corresponding to valid or selectable central commands are illuminated. An operator is thus immediately apprised of whether, for example, any type of aural communication is available and, if so, whether it is unidirectional or bidirectional. If aural communication is unidirectional, either "LISTEN-ONLY" key 64 or a "TALK-ONLY" key 102, but not both, will be illuminated. If bidirectional (but not duplex) communication is available, both "LISTEN-ONLY" key 64 and "TALK-ONLY" key 102 will be illuminated. If communication not only bidirectional but also duplex, "TWO-WAY VOICE" key 100 will be illuminated, either alone or in addition to "LISTEN-ONLY" key 64 and "TALK-ONLY" key 102. Persons of skill in the art will understand that the microphone selection functions described above with respect to keys 76, 78, 96 and 98 may be used to select the microphone or microphones in a local control unit having a selectable microphone function and either a listen-only function or a two-way voice function.

Referring again to FIG. 1, DTMF interface 42 is preferably bidirectional. Interface 30 can thus receive information via telephone line 43 in addition to via RS-232 line 37. The predetermined relationship stored in memory 38 can be changed from a remote location by transmitting information to interface 30 over a telephone connection in a suitable manner. For example, personnel at an updating center (not shown) may produce new predetermined relationships when manufacturers of local control units add to or change the functions of their local control units. The updating center may transmit the new predetermined relationships to the monitoring centers. Microcontroller 36 may, under the control of suitable software, store the received predetermined relationships in memory 38. Monitoring personnel can then be trained to use the updated universal interface.

Obviously, other embodiments and modifications of the present invention will occur readily to those of ordinary skill in the art in view of these teachings. Therefore, this invention is to be limited only by the following claims, which include all such other embodiments and modifications when viewed in conjunction with the above specification and accompanying drawings.

I claim:

1. An apparatus for generating local commands in a remotely monitored security system for transmission to a remote monitored site, comprising:

a controller for receiving an alarm type from said monitored site;

an input device for selecting a central command from a predetermined set of central commands;

a memory for storing a plurality of predetermined relationships, each uniquely corresponding to one said alarm type, each said predetermined relationship including at least one selectable command and at least one local command, said selectable command being in said predetermined set of central commands; and said controller for selecting a predetermined relationship in response to said alarm type and for producing a sequence of one or more local commands in response to the selected central command and the selected predetermined relationship.

2. The apparatus claimed in claim 1, further comprising a DTMF tone burst generator for generating at least one DTMF tone burst in response to each local command.

3. The apparatus claimed in claim 1, wherein said memory stores a plurality of states, and said controller changes a state in response to a selected central command.

4. The apparatus claimed in claim 1, wherein said input device comprises a keypad having a plurality of keys.

5. The apparatus claimed in claim 4, further comprising a plurality of selectably illuminatable selectable command indicators, each corresponding to one of said keys, and wherein said controller produces a set of selectable commands corresponding to said received alarm type and illuminates only said selectable command indicators corresponding to said selectable commands in said set of selectable commands.

6. The apparatus claimed in claim 5, wherein one said selectable command indicator is integral to each key and illuminates alphanumeric indicia on said key.

7. The apparatus claimed in claim 6, wherein a selectable command indicator begins blinking when said key corresponding to said selectable command indicator is actuated and stops blinking when a different illuminated key is actuated.

8. A method for monitoring a plurality of premises from a monitoring center at a remote location, comprising the steps of:

establishing a telephone connection between one of said premises and said monitoring center in response to activation of a sensor at said premises;

transmitting an alarm type over said telephone connection from said premises to said monitoring center;

selecting a predetermined relationship among a plurality of predetermined relationships in response to said alarm type, each said alarm type uniquely corresponding to one said predetermined relationship in said plurality of predetermined relationships, each said predetermined relationship including at least one selectable command and at least one local command;

manually entering a selectable command at said monitoring center;

producing a sequence of one or more local commands in response to said entered selectable command and said selected predetermined relationship; and transmitting said sequence of one or more local commands over said telephone connection from said monitoring center to said premises.

9. The method claimed in claim 8, further comprising the steps of:

establishing a telephone connection between said monitoring center and an updating center;

transmitting said predetermined relationship via said telephone connection from said updating center to said monitoring center; and storing said predetermined relationship in a memory at said monitoring center.

10. The method claimed in claim 8, further comprising the step of displaying at said monitoring center selectable commands corresponding to said alarm type in accordance with said predetermined relationship.

11. The method claimed in claim 10, wherein said step of displaying at said monitoring center selectable commands comprises illuminating at least one key on a keypad.

12. The method claimed in claim 8, further comprising the step of transmitting audio information in a first direction from a microphone at said premises over said telephone connection to a loudspeaker at said monitoring center.

13. The method claimed in claim 12, wherein said step of transmitting audio information in a first direction is performed in response to a first one of said selectable commands.

14. The method claimed in claim 13, further comprising the step of transmitting audio information in a second direction from a microphone at said monitoring center over said telephone connection to a loudspeaker at said premises.

15. The method claimed in claim 14, wherein said step of transmitting audio information in a second direction is performed in response to a second one of said selectable commands.

* * * * *